(12) United States Patent
Kesling et al.

(10) Patent No.: US 9,755,865 B2
(45) Date of Patent: Sep. 5, 2017

(54) RADIO FRONT END INTERFERENCE CANCELLATION USING DIGITAL SIGNALS

(71) Applicant: Intel Corporation, Santa Clara, CA (US)

(72) Inventors: William Dawson Kesling, Davis, CA (US); Andrew W. Martwick, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 336 days.

(21) Appl. No.: 14/140,588

(22) Filed: Dec. 26, 2013

(65) Prior Publication Data

US 2015/0188736 A1   Jul. 2, 2015

(51) Int. Cl.
*H04B 1/10* (2006.01)
*H04L 25/08* (2006.01)
*H04B 15/06* (2006.01)

(52) U.S. Cl.
CPC .................................. *H04L 25/08* (2013.01)

(58) Field of Classification Search
CPC ................................ H04B 1/10; H04B 1/109

USPC .................................................. 455/296–312
See application file for complete search history.

(56) References Cited

U.S. PATENT DOCUMENTS

| 5,574,978 | A | * | 11/1996 | Talwar et al. | 455/63.1 |
| 2005/0069063 | A1 | * | 3/2005 | Waltho et al. | 375/346 |
| 2007/0274372 | A1 | * | 11/2007 | Asai et al. | 375/130 |
| 2015/0049834 | A1 | * | 2/2015 | Choi et al. | 375/285 |

* cited by examiner

*Primary Examiner* — Lee Nguyen
(74) *Attorney, Agent, or Firm* — International IP Law Group, P.L.L.C.

(57) ABSTRACT

A computing device can include a radio receiver to receive a radio signal from a radio transmitter of a second computing or communication device. The radio receiver can experience radio frequency interference. The computing device can also include a digital signal generator. The digital signal generator can be to process a signal ($S_1$) underlying a source of the radio frequency interference. The digital signal generator can also be to generate a digital signal ($S_1$). The digital signal generator can further be to inject the digital signal ($S_1$) into the radio receiver to cancel the radio frequency interference around the radio frequency of interest.

21 Claims, 6 Drawing Sheets

RADIO FRONT END INTERFERENCE CANCELLATION USING DIGITAL SIGNALS

TECHNICAL FIELD

The present techniques relate generally to radio frequency interference (RFI). In particular, the present techniques relate to cancelling radio frequency interference.

BACKGROUND

Within a computing system, data signals can be transmitted along data buses to components of the computing system. These components can include memory devices and input/output (I/O) devices, among others. These data buses can include memory input/output (I/O), Peripheral Component Interconnect Express (PCIe), and Universal Serial Bus (USB), among others. The data signals can generate radio frequency interference (RFI). This interference can affect a variety of radios within the computing system, such as WiFi and cellular radios, and can disrupt normal reception of desired radio signals.

BRIEF DESCRIPTION OF THE DRAWINGS

Certain examples are described in the following detailed description and in reference to the drawings, in which.

The same numbers are used throughout the disclosure and the figures to reference like components and features. Numbers in the 100 series refer to features originally found in FIG. 1; numbers in the 200 series refer to features originally found in FIG. 2; and so on.

DETAILED DESCRIPTION OF SPECIFIC EMBODIMENTS

Examples disclosed herein provide techniques for cancelling radio frequency interference. The main sources of interference in a computing system today are data buses and radio transmitters. Computing systems employ careful metal shielding to overcome interference. Metal shielding can be expensive and can increase weight, design and test time, and manufacturing complication, increasing time-to-market for electronic devices employing metal shielding.

Radio transmitters in a computing system are strong interferers, even when operating at different frequencies than a receiver. Many new cellular radios use frequency-division duplexing (FDD), where the radio transmitter and receiver operate simultaneously. New WiFi radio receivers designed for low power and cost can have wideband front ends that are susceptible to cellular transmitters and other transmitters in the same system. The front end portion of a radio is the component operating at the radio frequency (RF), as compared to the baseband portion that operates at lower frequencies. Both cellular and WiFi, as well as other radios, can employ multiple front end components between the radio integrated circuits (IC's) and antennas to mitigate interference from radio transmitters to receivers in the same system. These components can be more expensive than the front end integrated circuits themselves. In addition, because of interference concerns, radio front end amplifiers, mixers, and data converters require tightened specifications. These tightened specifications complicate radio IC design and drive up power consumption and costs. Active interference cancellation can reduce the power, cost, and board area consumed by such components.

Active interference cancellation can be employed at any of several points in a radio receiver. Baseband cancellation can be useful for low-level interference. However, front end cancellation can be more effective in cases where interference effects on front end amplifiers, down-conversion mixers, and data converters is severe. Front end cancellation is typically done using replicas of front end circuits that process only the desired signal or the interference signal. Combining signals from the original circuits, which process the desired radio signal with interference, with signals from the replica circuits results in interference reduction. However, the radio front end circuits that are replicated are among the most power-hungry components of radio systems. Accordingly, this cancellation method is cost and power prohibitive in normal consumer electronics.

A front end cancellation approach which does not employ replica circuits is described. Signal processing techniques can be used instead of replica circuits to deliver an estimate of the interference to the front end, resulting in a low-power and digitally integrated solution. In particular, interference can be cancelled using a digital signal injected into the radio front end. The digital signal has spectral energy matching that of the interference source, but with opposite phase. This injected digital signal interference cancellation system is simple to add to existing radio systems compared to existing cancellation methods. The injected digital signal interference cancellation system also allows low power, due to no duplicate radio circuits, and simple integration, due to fully digital circuitry, compared to existing approaches.

Figure 1:
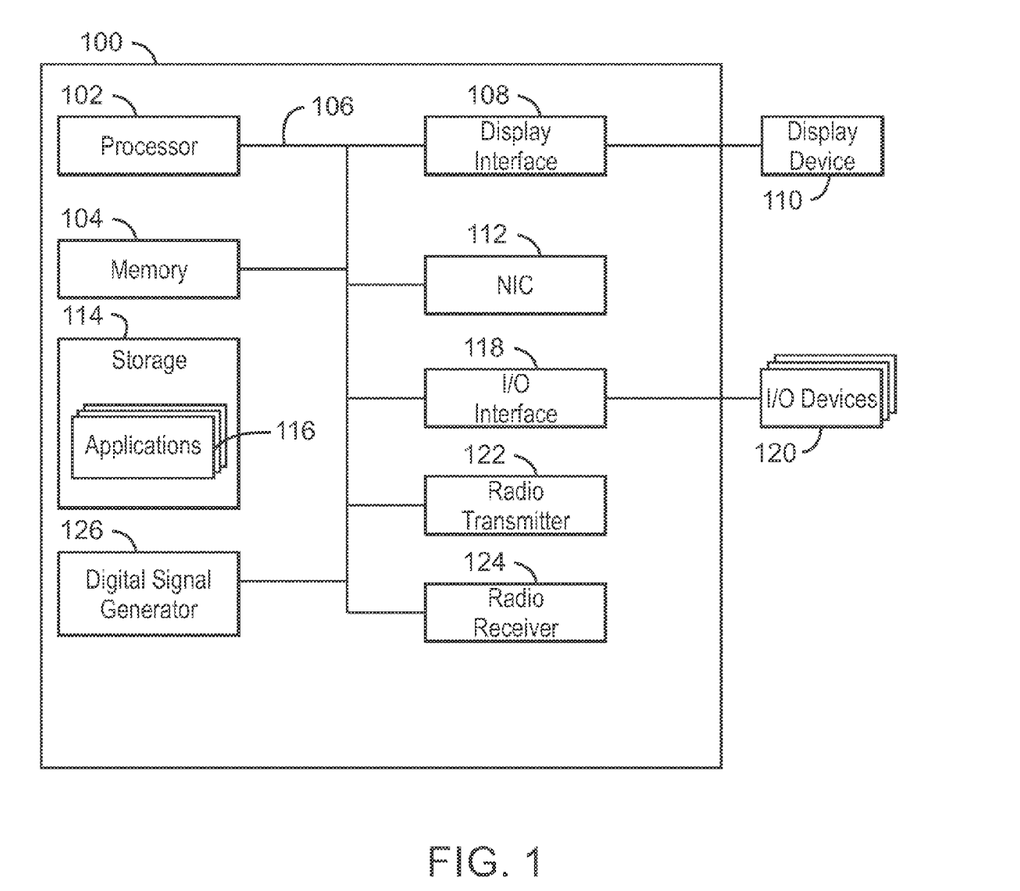
FIG. 1 is a block diagram of an example of a computing device.

FIG. 1 is a block diagram of an example of a computing device 100. The computing device 100 can be, for example, a mobile phone, laptop computer, ultrabook, desktop computer, server, or tablet computer, among others. The computing device 100 can include a processor 102 that is adapted to execute stored instructions, as well as a memory device 104 that stores instructions that are executable by the processor 102. The processor 102 can be a single core processor, a multi-core processor, a computing cluster, or any number of other configurations. The processor 102 can be implemented as Complex Instruction Set Computer (CISC) or Reduced Instruction Set Computer (RISC) processors, x86 Instruction set compatible processors, multi-core, or any other microprocessor or central processing unit (CPU). In some examples, the processor 102 includes dual-core processor(s), dual-core mobile processor(s), or the like. The PROCESSOR 102 can be coupled to the memory device 104 by a bus 106.

The memory device 104 can include random access memory (e.g., SRAM, DRAM, zero capacitor RAM, SONOS, eDRAM, EDO RAM, DDR RAM, RRAM, PRAM, etc.), read only memory (e.g., Mask ROM, PROM, EPROM, EEPROM, etc.), flash memory, or any other suitable memory systems. The memory device 104 can be used to store computer-readable instructions that, when executed by the processor, direct the processor to perform various operations in accordance with examples described herein.

The PROCESSOR 102 can be linked through the bus 106 to a display interface 108 to connect the computing device 100 to a display device 110. The display 110 can be a built-in component of the computing device 100 externally connected to the computing device 100. The display device 110 can also include a computer monitor, television, or projector, among others, that is externally connected to the computing device 100.

A network interface card (NIC) 112 can connect the computing device 100 through the system bus 106 to a network (not depicted). The network (not depicted) can be a wide area network (WAN), local area network (LAN), or the Internet, among others. In an example, the computing device 100 can connect to a network via a wired connection or a wireless connection.

The computing device 100 also includes a storage device 114. The storage device 114 is a physical memory such as a hard drive, an optical drive, a thumbdrive, a secure digital (SD) card, a microSD card, an array of drives, or any combinations thereof, among others. The storage device 114 can also include remote storage drives. The storage device 114 includes any number of applications 116 that are configured to run on the computing device 100.

The processor 102 can also be connected through the bus 106 to an input/output (I/O) device interface 118 configured to connect the computing system to an I/O device(s). The I/O devices 120 can be built-in components of the computing device 100, or can be devices that are externally connected to the computing device 100. For example, the I/O devices 120 can include a keyboard and a pointing device, wherein the pointing device can include a touchpad or a touchscreen, among others.

In some examples, the processor 102 and memory device 104 can be separate integrated circuit chips coupled to a mother board. In some examples, one or more of the processor 102, memory device 104, and I/O interface 118 can be included in a multi-chip module (MCM), multi-chip package (MCP), or system-on-a-chip (SoC). Depending on the design considerations of a particular implementation, bus 106 may consist of one or more separate buses and the signal lines of the one or more of the buses 106 can be disposed, at least in part, on one or more circuit boards.

The computing device 100 can also include a radio transmitter 122 to transmit signals to a radio receiver, the radio receiver included in an additional computing device (not depicted). The radio transmitter 122 can be any suitable type of transmitter, including a cellular transmitter, a WiFi transmitter, a long term evolution (LTE) transmitter, a wideband code division multiple access (WCDMA) transmitter, or a Bluetooth transmitter, among others. The computing device 100 can also include a radio receiver 124 to receive signals from the additional computing device (not depicted). The radio receiver 124 can be any suitable type of receiver, including a cellular receiver, a WiFi receiver, or a Bluetooth receiver, among others. Additionally, the computing device 100 can include any suitable number of radio transmitters 122 and radio receivers 124. Some or all of these radio transmitters and receivers can be part of an NIC 112.

The computing device 100 further includes a digital signal generator 126 to cancel radio interference in a radio receiver 124. The digital signal generator 126 processes a signal ($S_0$) underlying the source of radio interference. For example, the radio interference can originate from a radio transmitter included in the computing device 100 or in an additional computing device (not shown) coupled to the computing device 100, or a system bus included in the computing device 100, among others. The signal ($S_0$) can be binary data being sent between chips or a time domain baseband signal before upconversion in a wireless transmitter, among others. The digital signal generator 126 can generate a digital signal ($S_1$). The digital signal ($S_1$) has spectral energy that is proportional to that created by $S_0$ at the interference frequency of interest. In an example, $S_1$ can be a single binary waveform. The digital signal generator 126 injects $S_1$ at a low power level into the front end of the radio receiver 124 suffering interference. The digital signal generator 126 can inject $S_1$ via resistive, inductive, capacitive, transmission line or radiated coupling, among others. The digital signal generator 126 can also adjust the relative magnitude and phase of $S_1$'s spectrum for best performance during generation of $S_1$. In an example, this adjustment can be automated using radio error information.

It is to be understood the block diagram of FIG. 1 is not intended to indicate that the computing device 100 is to include all of the components shown in FIG. 1 in every case. Further, any number of additional components can be included within the computing device 100, depending on the details of the specific implementation.

Figure 2:
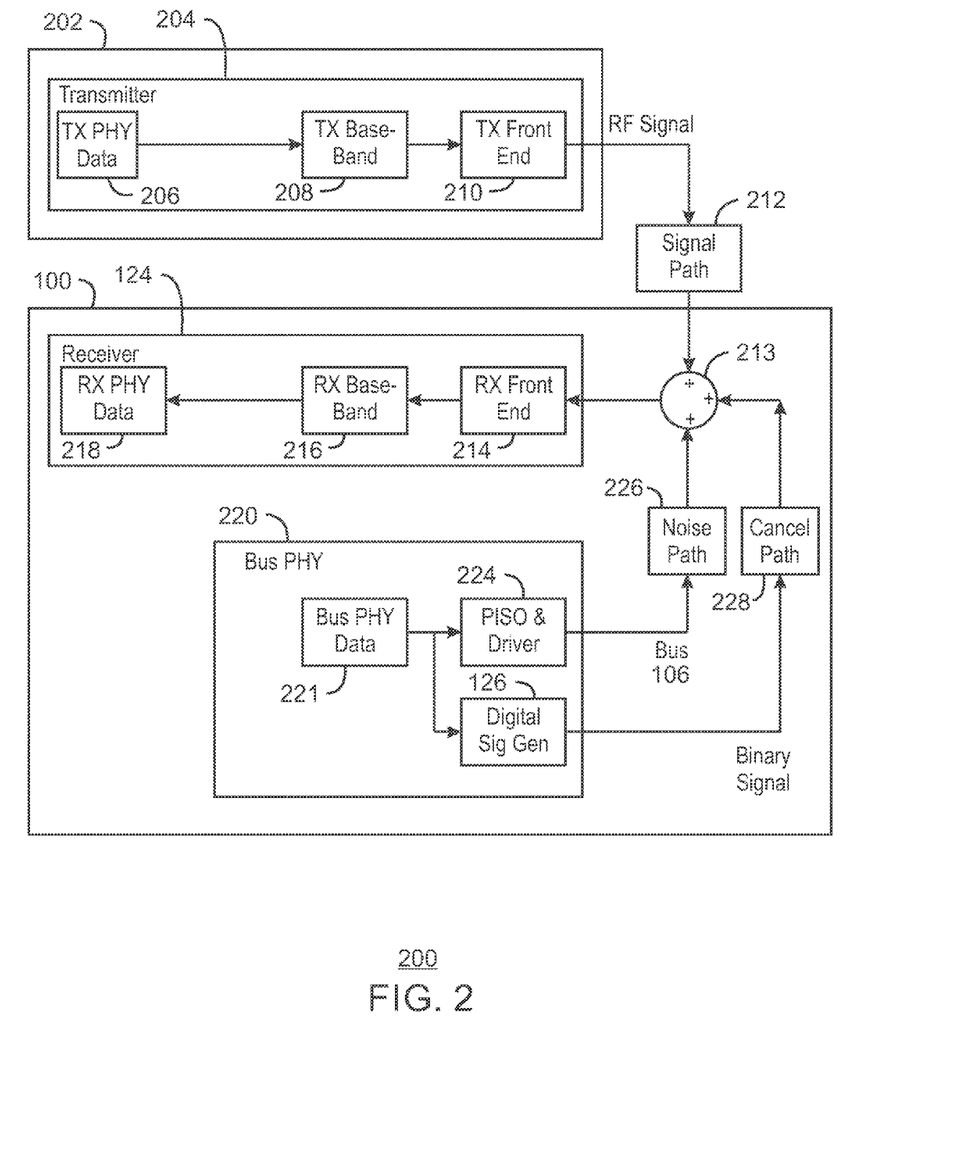
FIG. 2 is a block diagram of an example of a computing system.

FIG. 2 is a block diagram of an example of a computing system 200. In an example, the computing system 200 can be a communication system. The computing system 200 can include the computing device 100 and a second device 202. The second device 202 can be a computing device or a communication device. For example, the second device 202 can be a cellular base station, a WiFi access point, a GPS satellite, or a Bluetooth device, among others. The second device 202 can include a transmitter 204 to transmit signals to a radio receiver 124 of the computing device 100. In the transmitter 204, TX PHY data 206 can be transferred to the TX baseband 208 to generate a baseband signal. The baseband signal can be delivered to the TX front end 210 for up-conversion to an RF signal. The RF signal can be any suitable type of RF signal, such as a cellular signal, a WiFi signal, or a Bluetooth signal, among others. The RF signal can be transmitted by the front end 210 of the transmitter 204 along the RF signal path 212 to the receiver 124. The RF signal can be received in the antenna 213, passed to the front end 214 of the receiver 124, and down-converted to a baseband signal for the RX Baseband 216. The RX baseband 216 recovers the data signal from the transmitted TX PHY data 206. The recovered data signal is transferred from the RX baseband 216 to the RX PHY data 218 of the receiver 124. The data signal can be transferred from the RX PHY data 218 to an additional component of the computing device 100, such as the processor 102 or the memory device 104.

The receiver 124 can be subject to interference. In an example, the interference can originate from a system bus 106. The computing device 100 can include a bus PHY 220 to send bus data between components of the computing device 100. The bus PHY 220 can include bus PHY data 221 to prepare digital bus data to be sent over the bus. In addition, the bus PHY 220 can also include a PISO (parallel-in-serial-out) & driver 224 to rearrange bus data bits and convert the bus data bits to a bus signal with suitable characteristics for the bus 106. The bus signal can radiate electromagnetic energy that couples through a noise path 226 and combines with the RF signal from transmitter 204 in the receiver antenna 213. The resulting RF signal with bus interference can then be passed to the RX front end 214 of the receiver 124. In general, bus interference can combine with the RF signal at a point other than at the antenna 213 in the RX front end. For example, the bus signal can couple through a power delivery network and combine with the RF signal in a low noise amplifier (LNA), among other possibilities. The bus PHY 220 can include a digital signal generator 126 to process the digital signal ($S_0$) underlying the source of radio interference and to generate a digital signal $S_1$ to cancel the radio interference. The digital signal generator 126 can pass the digital signal $S_1$ through a cancellation path 228 and antenna 213 for delivery into the receiver front end 214 to cancel the radio interference on the frequency on which the receiver 124 is receiving. In general, the cancellation signal can also be injected into the front end at a point other than at the antenna 213. For example, the cancellation signal can be injected at a unidirectional coupler, at the LNA output, or at some other point between the antenna 213 and mixer of the receiver 124.

It is to be understood the block diagram of FIG. 2 is not intended to indicate that the computing system 200 is to include all of the components shown in FIG. 2 in every case. Further, any number of additional components can be included within the computing system 200, depending on the details of the specific implementation.

Figure 3:
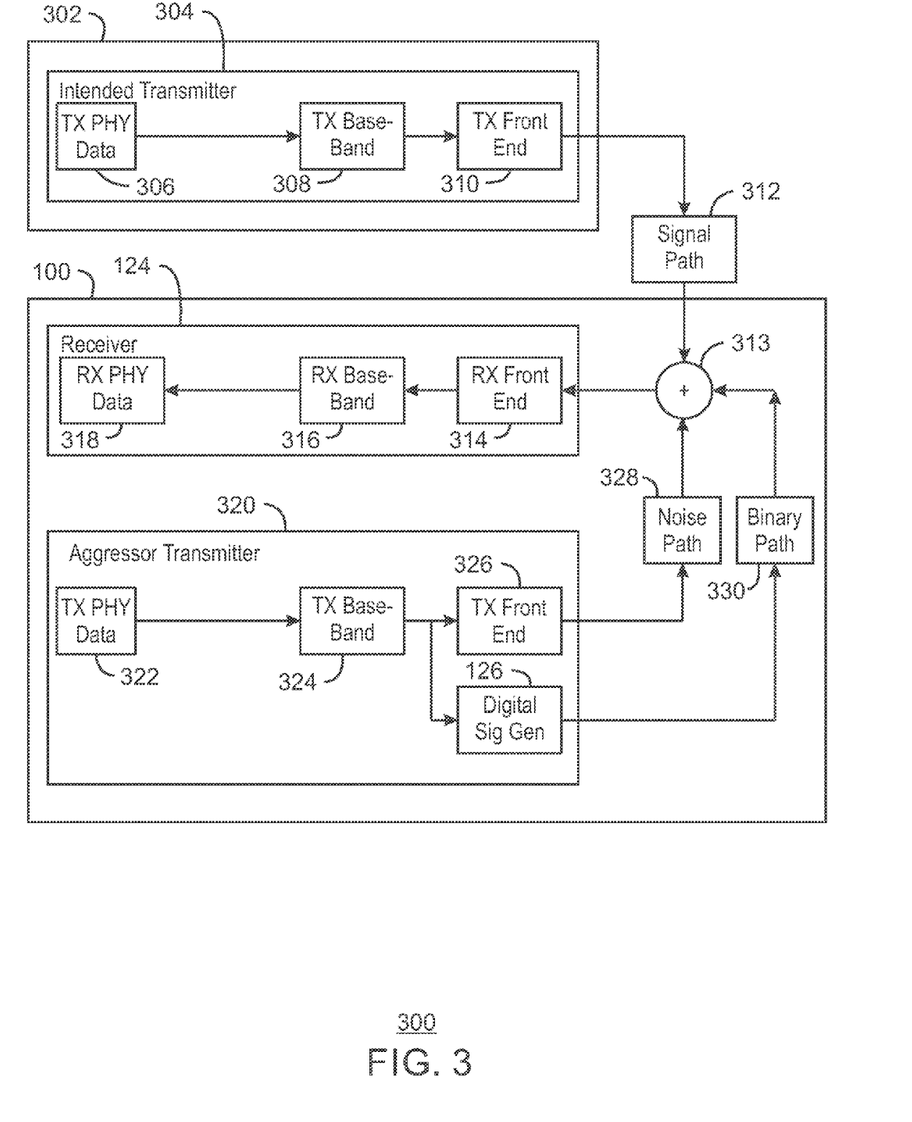
FIG. 3 is a block diagram of an example of another computing system.

FIG. 3 is a block diagram of another example of a computing system 300. The computing system can include the computing device 100 and a second computing or communication device 302. The second device 302 can include an intended transmitter 304 to transmit data signals to a radio receiver 124 of the computing device 100. In the intended transmitter 304, the TX PHY data 306 can be transferred to the TX baseband 308 for up-conversion by the TX front end 310 to generate the desired RF signal. The RF signal can be any suitable type of RF signal, such as a cellular signal, a WiFi signal, or a Bluetooth signal, among others. The RF signal can be transmitted along the signal path 312 to the antenna 313 of the receiver 124. The RF signal can be received in the front end 314 of the receiver 124 and down-converted for the RX baseband 316. The RX baseband 316 recovers the data signal from the TX PHY data 306. The data signal can be transferred from RX PHY data 318 to an additional component of the computing device 100, such as the processor 102 or the memory device 104.

The receiver 124 can be subject to interference. In an example, the interference can originate from a transmitter 320 in the computing device 100 that unintentionally acts as an interference aggressor to the receiver 124. The TX PHY data 322 in the aggressor transmitter 320 can be transferred to the TX baseband 324 for conversion into a baseband signal. The baseband signal can be transferred to the front end 326 for up-conversion to an RF signal that unintentionally or unavoidably couples through the noise path 328 to the receiver 124. Interference can be generated by transmission of the aggressing RF signal. The aggressor transmitter 320 can include a digital signal generator 126 to process a signal ($S_0$) underlying the source of radio interference and to generate a digital signal $S_1$ to cancel the radio interference. The signal $S_0$ can be a digital representation of the baseband signal, for example. The spectrum of the aggressing RF signal is generally similar to the spectrum of the baseband signal, except for a frequency offset and the possible effect of filters in the TX baseband 324 or TX front end 326. The digital signal generator 126 can account for these fixed differences between the spectrum of the RF signal and the baseband signal. In this way, the digital signal generator 126 can create a relatively low frequency cancellation signal from the relatively low frequency baseband signal to cancel the effect of the relatively high frequency aggressing RF signal on the relatively high frequency on which the receiver 124 is receiving. The digital signal generator 126 can inject the digital signal $S_1$ into the receiver front end 314 to cancel the radio interference on the frequency on which the receiver 124 is receiving.

It is to be understood the block diagram of FIG. 3 is not intended to indicate that the computing system 300 is to include all of the components shown in FIG. 3 in every case. Further, any number of additional components can be included within the computing system 300, depending on the details of the specific implementation.

Figure 4:
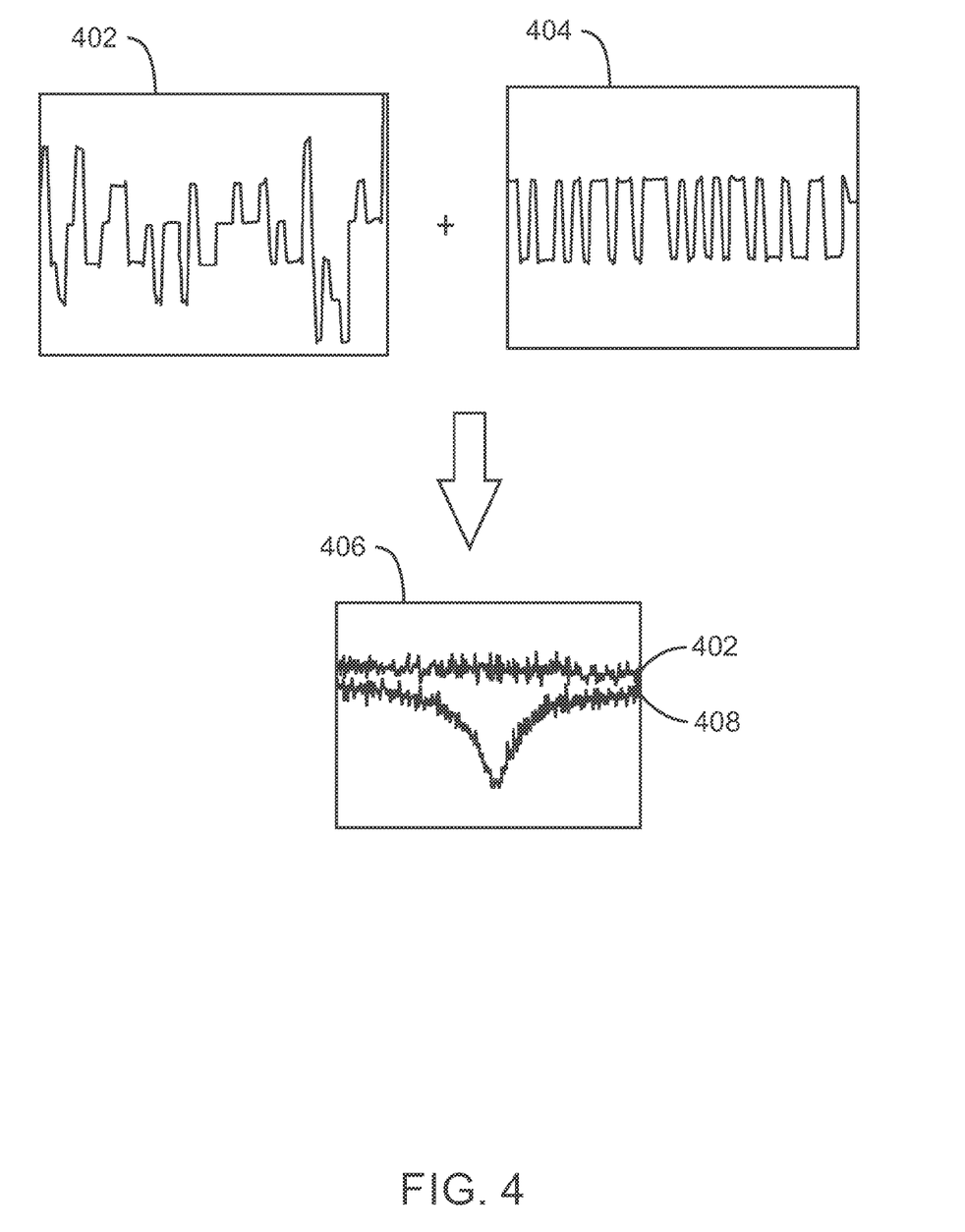
FIG. 4 is a set of charts illustrating the effect of the digital signal generator on radio interference.

FIG. 4 is a set of charts illustrating the effect of the digital signal generator 126 on interference. Plot 402 illustrates the measured superposition of eight lanes of binary data running at 800 Mbits/s (i.e., $S_0$). Plot 404 shows a measured binary cancellation signal ($S_1$). Plot 406 shows the spectral energy of the signals in plot 402 and plot 404 around a radio frequency of 1.2 GHz. The upper spectrum 402 in plot 406 corresponds to the signal in plot 402, and the lower spectrum 408 in plot 406 corresponds to the combination of the signals in plots 402 and 404. As illustrated by the comparison of spectrum 402 to spectrum 408, the combination of signal $S_0$ and binary cancellation signal $S_1$ results in a decrease in interference at the interference frequency of interest, 1.2 GHZ in this case.

Figure 5:
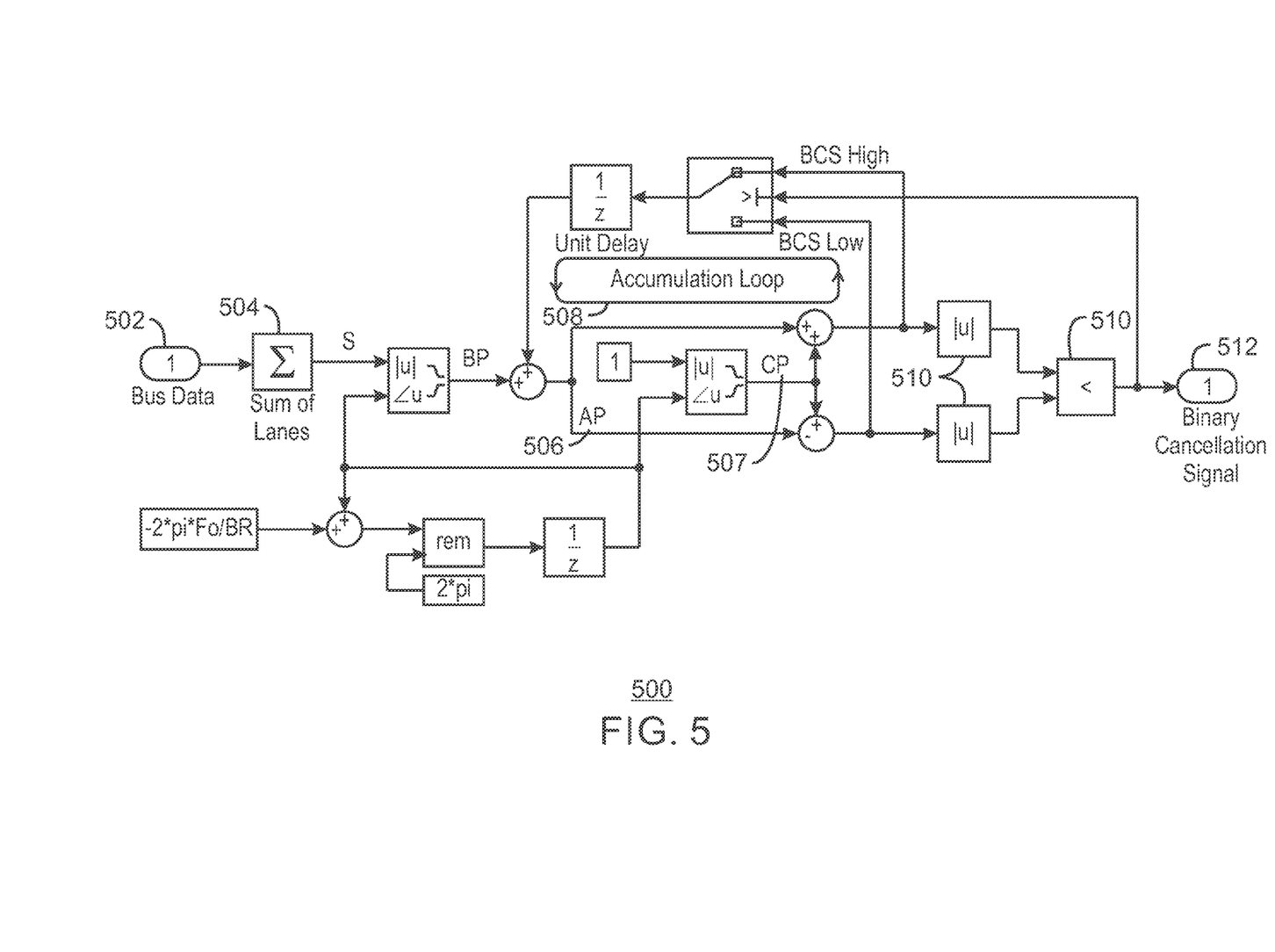
FIG. 5 is a block diagram of an example of a digital signal generator.

FIG. 5 is a block diagram of an example of a digital signal generator 500. The digital signal generator 500 can be a circuit. Multiple lanes of bus data can be added together to form the magnitude of a complex valued bit time phasor (BP). The phase of BP rotates clockwise at a rate dependent on the interference frequency of interest ($f_0$) and the bus bit signaling rate (BR) of any individual lane. For bit sample time n, the interference can be estimated using Equation 1.

$$BP_n = S_n e^{-j \cdot 2\pi f_0 \frac{n}{BR}} \quad \text{(Eq. 1)}$$

The lanes of bus data are input 502 to the digital signal generator 500. The lanes of bus data are summed 504 to determine signal S. The bit phasors are accumulated in the accumulation loop 508 of the digital signal generator 500. If the node labeled accumulated phasor (AP) 506 were connected directly to the input of the unit delay, then node AP 506 would be the summation of bit phasors (BP) over time. This summation would be a discrete time Fourier transform and represent the spectral component of signal S at frequency $f_0$.

However, another bit phasor CP 507, representing the desired cancellation signal, is added inside the accumulation loop 508. Because of this additional bit phasor, the signal AP 506 actually represents the spectral component of the combination of the data bus and the cancellation signal. The bit phasors representing the two possible states of the binary cancellation signal are compared at the comparison node 510. The state of the binary cancellation signal resulting in the lowest accumulated phasor is chosen in the accumulation loop 508. The resulting binary cancellation signal is output 512 at the end of the circuit of the digital signal generator 500.

It is to be understood the block diagram of FIG. 5 is not intended to indicate that the digital signal generator 500 is to include all of the components shown in FIG. 5 in every case. Further, any number of additional components can be included within the computing system 500, depending on the details of the specific implementation.

Figure 6:
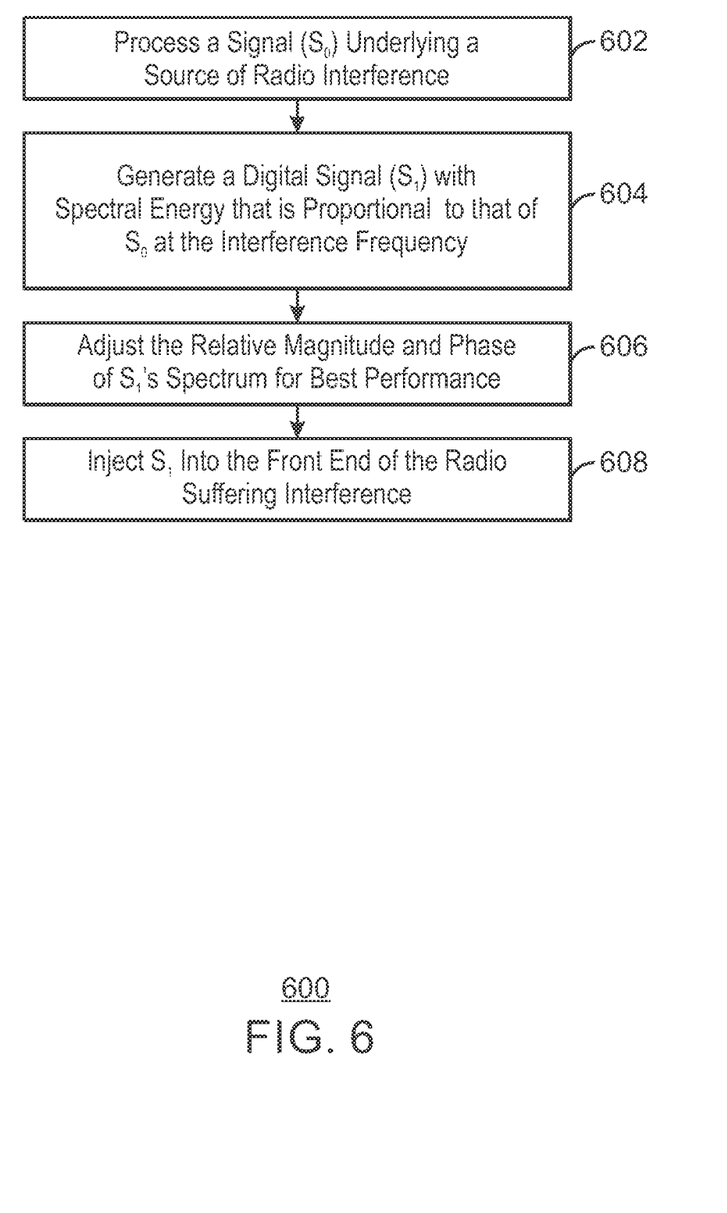
FIG. 6 is a process flow diagram of an example of a method of cancelling radio frequency interference.

FIG. 6 is a process flow diagram of an example of a method 600 of cancelling radio interference. At block 602, a signal ($S_0$) underlying a source of radio interference can be processed. A digital signal generator of a computing device, such as digital signal generator 126 or 500, can process the digital signal $S_0$. In an example, the radio interference can be generated by a system bus within the computing device including a radio receiver. In another example, the radio interference can be generated by a radio transmitter within the computing device including the radio receiver, where the transmitter is transmitting simultaneously with operation of the receiver.

At block 604, a digital signal ($S_1$) with spectral energy that is proportional to that of signal $S_0$ at the interference frequency can be generated. The digital signal $S_1$ can be generated by the digital signal generator. At block 606, the relative magnitude and phase of the digital signal's ($S_1$) spectrum can be adjusted for the best cancellation.

At block 606, the digital signal $S_1$ can be injected into the front end of the radio suffering interference. The radio suffering interference can be any radio, such as a receiver. The receiver can be any suitable type of receiver, such as a cellular receiver, a WiFi receiver, or a Bluetooth receiver, among others.

It is to be understood the process flow diagram of FIG. 6 is not intended to indicate that the method 600 is to include all of the blocks shown in FIG. 6 in every case. Further, any number of additional blocks can be included within the method 600, depending on the details of the specific implementation.

Example 1

A computing device is described herein. The computing device includes a radio receiver to receive a radio frequency signal from a radio transmitter of a second device. The radio receiver is to experience radio frequency interference. The computing device also includes a digital signal generator. The digital signal generator is to process a signal ($S_0$) underlying a source of the radio frequency interference. The digital signal generator is also to generate a digital signal ($S_1$). The digital signal generator is further to inject the digital signal ($S_1$) into the radio receiver to cancel the radio frequency interference.

The radio receiver can include a front end and the digital signal ($S_1$) can be injected into the front end. The digital signal ($S_1$) can include spectral energy substantially proportional to spectral energy of the signal ($S_0$) at an interference frequency. The computing device can include a system bus and the radio frequency interference can originate from the system bus. The computing device can include a radio transmitter and the radio frequency interference can originate from the radio transmitter. The digital signal $S_1$ can be to cancel the effect of signal $S_0$ at a radio frequency, the radio frequency including a radio frequency at which the radio receiver is to receive. The radio receiver can be a cellular receiver, a WiFi receiver, a Bluetooth receiver, a long term evolution (LTE) receiver, a wideband code division multiple access (WCDMA) receiver, or a GPS receiver.

Example 2

A digital signal generator is described herein. The digital signal generator includes a digital signal generator of a computing device. The digital signal generator is to process a signal ($S_0$) underlying a source of radio frequency interference. The digital signal generator is also to generate a digital signal ($S_1$). The digital signal generator is further to inject the digital signal ($S_1$) into a radio receiver of the computing device experiencing the radio frequency interference to cancel the radio frequency interference.

The radio receiver can include a front end and the digital signal ($S_1$) can be injected into the front end. The digital signal ($S_1$) can include spectral energy substantially proportional to spectral energy resulting from the signal ($S_0$) at an interference frequency. The computing device can include a system bus and the radio frequency interference can originate from the system bus. The computing device can include a radio transmitter and the radio frequency interference can originate from the radio transmitter. The digital signal $S_1$ can cancel the effect of signal ($S_0$) at a radio frequency, the radio frequency including a radio frequency at which the radio receiver is to receiver. The radio receiver can be a cellular receiver, a WiFi receiver, a Bluetooth receiver, a long term evolution (LTE) receiver, a wideband code division multiple access (WCDMA) receiver, or a GPS receiver.

Example 3

A computing system is described herein. The computing system includes logic to process a signal ($S_0$) underlying a source of the radio frequency interference. The computing system also includes logic to generate a digital signal ($S_1$). The computing system further includes logic to inject the digital signal ($S_1$) into a radio receiver of the computing system experiencing the radio frequency interference to cancel the radio frequency interference.

The computing system can further include logic to adjust a relative magnitude and phase of a spectrum of the digital signal $S_1$ for maximum cancellation. The radio receiver can include a front end and the digital signal ($S_1$) can be injected into the front end. The digital signal ($S_1$) can include spectral energy substantially proportional to spectral energy resulting from the signal ($S_0$) at an interference frequency. The computing system can include a system bus and the radio frequency interference can originate from the system bus. The computing system can include a radio transmitter and the radio frequency interference can originate from the radio transmitter. The digital signal $S_1$ can cancel the effect of signal $S_0$ at a radio frequency, the radio frequency including a radio frequency at which the radio receiver is to receive.

In the foregoing description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the preceding description, various aspects of the disclosed subject matter have been described. For purposes of explanation, specific numbers, systems and configurations were set forth in order to provide a thorough understanding of the subject matter. However, it is apparent to one skilled in the art having the benefit of this disclosure that the subject matter may be practiced without the specific details. In other instances, well-known features, components, or modules were omitted, simplified, combined, or split in order not to obscure the disclosed subject matter.

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

While the present techniques may be susceptible to various modifications and alternative forms, the exemplary examples discussed above have been shown only by way of example. It is to be understood that the technique is not intended to be limited to the particular examples disclosed herein. Indeed, the present techniques include all alternatives, modifications, and equivalents falling within the true spirit and scope of the appended claims.

What is claimed is:

1. A computing device, comprising:
   a radio receiver to receive a radio frequency signal from a radio transmitter of a second device,
   the radio receiver to experience radio frequency interference; and
   a digital signal generator to:
   process a signal ($S_0$) underlying a source of the radio frequency interference;
   generate a digital signal ($S_1$); and
   inject the digital signal ($S_1$) into the radio receiver to cancel the radio frequency interference.

2. The computing device of claim 1, wherein the radio receiver comprises a front end and wherein the digital signal ($S_1$) is injected into the front end.

3. The computing device of claim 1, wherein the digital signal ($S_1$) comprises spectral energy substantially proportional to spectral energy of the signal ($S_0$) at an interference frequency.

4. The computing device of claim 1, wherein the computing device comprises a system bus and wherein the radio frequency interference is to originate from the system bus.

5. The computing device of claim 1, wherein the computing device comprises a radio transmitter and wherein the radio frequency interference is to originate from the radio transmitter.

6. The computing device of claim 1, wherein the digital signal $S_1$ is to cancel the effect of signal $S_0$ at a radio frequency, the radio frequency comprising a radio frequency at which the radio receiver is to receive.

7. The computing device of claim 1, wherein the radio receiver comprises a cellular receiver, a WiFi receiver, a Bluetooth receiver, a long term evolution (LTE) receiver, a wideband code division multiple access (WCDMA) receiver, or a GPS receiver.

8. A digital signal generator, comprising:
   a digital signal generator of a computing device, the digital signal generator to:
   process a signal ($S_0$) underlying a source of radio frequency interference;
   generate a digital signal ($S_1$); and
   inject the digital signal ($S_1$) into a radio receiver of the computing device experiencing the radio frequency interference to cancel the radio frequency interference.

9. The digital signal generator of claim 8, wherein the radio receiver comprises a front end and wherein the digital signal ($S_1$) is injected into the front end.

10. The digital signal generator of claim 8, wherein the digital signal ($S_1$) comprises spectral energy substantially proportional to spectral energy resulting from the signal ($S_0$) at an interference frequency.

11. The digital signal generator of claim 8, wherein the computing device comprises a system bus and wherein the radio frequency interference is to originate from the system bus.

12. The digital signal generator of claim 8, wherein the computing device comprises a radio transmitter and wherein the radio frequency interference is to originate from the radio transmitter.

13. The digital signal generator claim 8, wherein the digital signal $S_1$ is to cancel the effect of signal $S_0$ at a radio frequency, the radio frequency comprising a radio frequency at which the radio receiver is to receive.

14. The digital signal generator of claim 8, wherein the radio receiver comprises a cellular receiver, a WiFi receiver, a Bluetooth receiver, a long term evolution (LTE) receiver, a wideband code division multiple access (WCDMA) receiver, or a GPS receiver.

15. A computing system, comprising:
a processor to process a signal ($S_0$) underlying a source of the radio frequency interference;
logic to generate a digital signal ($S_1$); and
logic to inject the digital signal ($S_1$) into a radio receiver of the computing system experiencing the radio frequency interference to cancel the radio frequency interference.

16. The computing system of claim 15, further comprising logic to adjust a relative magnitude and phase of a spectrum of the digital signal $S_1$ for maximum cancellation.

17. The computing system of claim 15, wherein the radio receiver comprises a front end and wherein the digital signal ($S_1$) is injected into the front end.

18. The computing system of claim 15, wherein the digital signal ($S_1$) comprises spectral energy substantially proportional to spectral energy resulting from the signal ($S_0$) at an interference frequency.

19. The computing system of claim 15, wherein the computing system comprises a system bus and wherein the radio frequency interference is to originate from the system bus.

20. The computing system of claim 15, wherein the computing system comprises a radio transmitter and wherein the radio frequency interference is to originate from the radio transmitter.

21. The computing system of claim 15, wherein the digital signal $S_1$ is to cancel the effect of signal $S_0$ at a radio frequency, the radio frequency comprising a radio frequency at which the radio receiver is to receive.

* * * * *